US012714966B2

(12) United States Patent
Bosch

(10) Patent No.: US 12,714,966 B2
(45) Date of Patent: Aug. 25, 2026

(54) CHEMICAL ADDITIVES FOR DIRECT AIR CARBON CAPTURE

(71) Applicant: Halliburton Energy Services, Inc., Houston, TX (US)

(72) Inventor: Ronald Bosch, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 540 days.

(21) Appl. No.: 18/200,101

(22) Filed: May 22, 2023

(65) Prior Publication Data

US 2024/0390839 A1 Nov. 28, 2024

(51) Int. Cl.

*B01D 15/36* (2006.01)
*B01D 53/14* (2006.01)
*B01D 53/18* (2006.01)
*B01D 53/62* (2006.01)
*B01D 53/78* (2006.01)

(52) U.S. Cl.

CPC ....... *B01D 53/1475* (2013.01); *B01D 15/361* (2013.01); *B01D 53/1493* (2013.01); *B01D 53/18* (2013.01); *B01D 53/62* (2013.01); *B01D 53/78* (2013.01); *B01D 2252/204* (2013.01); *B01D 2252/2053* (2013.01); *B01D 2252/60* (2013.01)

(58) Field of Classification Search

CPC .............. B01D 15/361; B01D 53/1475; B01D 53/1493; B01D 53/18; B01D 2252/60
See application file for complete search history.

(56) References Cited

U.S. PATENT DOCUMENTS 8,119,091 B2 2/2012 Keith et al.
8,728,428 B1 5/2014 Heidel et al.
9,975,100 B2 5/2018 Heidel et al.
11,014,823 B2 5/2021 Heidel et al.
12,139,667 B1 * 11/2024 Mast ........................ C09K 8/74
2010/0086983 A1 * 4/2010 Gellett ............... B01D 53/8671 435/182
2011/0223650 A1 9/2011 Saunders et al.

(Continued)

FOREIGN PATENT DOCUMENTS

CN 112638863 A * 4/2021 ............... C11D 7/26
WO WO-2022015882 A1 * 1/2022 ............ C25B 15/08

OTHER PUBLICATIONS

Sanz-Perez et al., Direct Capture of CO2 from Ambient Air, Chem. Rev. 2016, 116, 11840-11876.*

(Continued)

*Primary Examiner* — Jun Li
(74) *Attorney, Agent, or Firm* — DILWORTH IP, LLC

(57) ABSTRACT

A variety of methods and systems are disclosed, including, in one example, a method of direct air capture including: introducing an air stream comprising carbon dioxide into gas-liquid contactor; contacting the air stream with a treatment fluid comprising a surfactant, wherein the carbon dioxide is at least partially soluble in the treatment fluid, and wherein the carbon dioxide reacts with the treatment fluid to form a reaction product; performing an ion exchange reaction between the reaction product and a base in the presence of the surfactant to form an ion exchange product; and precipitating the ion exchange product to form a precipitate.

8 Claims, 1 Drawing Sheet

(56) References Cited

U.S. PATENT DOCUMENTS

| | | | |
|---|---|---|---|
| 2012/0238006 | A1 | 9/2012 | Gartner et al. |
| 2013/0115153 | A1 | 5/2013 | Lackner et al. |
| 2017/0253846 | A1* | 9/2017 | Bernfeld ................ C12M 39/00 |
| 2019/0359894 | A1 | 11/2019 | Heidel et al. |
| 2020/0009527 | A1* | 1/2020 | Weissman .............. B01D 53/96 |
| 2020/0038796 | A1* | 2/2020 | Fekety .................. C03B 19/106 |
| 2020/0070091 | A1 | 3/2020 | Kumar et al. |
| 2022/0362708 | A1 | 11/2022 | Voskian et al. |
| 2022/0362737 | A1 | 11/2022 | Staufcik et al. |
| 2022/0401876 | A1 | 12/2022 | Vieira et al. |

OTHER PUBLICATIONS

Carbon Engineering, Tech Update: Pellet reactor progress, Jul. 27, 2015.

Carbon Engineering, A process for capturing CO2 from the atmosphere, Jan. 24, 2021.

Progress in Energy, a review of direct air capture, McQueen, et al. 2021.

International Search Report and Written Opinion for International Patent Application No. PCT/US2024/011254 dated May 13, 2024. PDF file. 9 pages.

* cited by examiner

CHEMICAL ADDITIVES FOR DIRECT AIR CARBON CAPTURE

BACKGROUND

Direct Air Capture (DAC) and Direct Air Capture and Carbon Storage (DACCS) have become topics of interest among engineers and scientists for their potential for removing carbon dioxide directly from ambient air and the environment. These processes involve the use of large-scale industrial systems using chemical or physical means to capture carbon dioxide from the atmosphere and then convert the captured carbon dioxide to a more concentrated form for future use or sequestration (e.g., subsurface geologic storage). DAC and DACCS are considered forms of negative emissions technology, as they may remove carbon dioxide from the atmosphere and effectively reduce the amount of greenhouse gases present in the atmosphere.

BRIEF DESCRIPTION OF THE DRAWINGS

These drawings illustrate certain aspects of some of the examples of the present disclosure and should not be used to limit or define the method.

DETAILED DESCRIPTION

Disclosed herein are methods and systems for direct air capture of a target species and, more particularly, disclosed are methods and systems for direct air capture incorporating one or more surface-active agents (i.e., surfactants). Recent developments in the field of direct air capture include methods involving the use of blower systems and air/liquid contactors contact ambient air with a solvent for extracting carbon dioxide from the air. However, the present direct air capture methods are inefficient in part due to the relatively low solubility of gasses in liquids. Particularly, carbon dioxide has a relatively low solubility when contacted with a solvents in the liquid/air contactor, making it costly to implement these methods on a large scale. In addition, the extreme dilution of carbon dioxide in air requires that a strong base be used, which further drives the high energy requirement, while the corrosive nature of these strong bases further imposes limitations on the extent which they may be used in the solvents.

Advantages of the present disclosure may include improved overall efficiencies of performing direct air capture by including a surfactant in the feed to an air/liquid contactor. Other advantages may include a reduction in the need for oversized process equipment as well as a reduction in overall operational cost of direct air capture units. Other advantages may include greater yield of a recaptured species per volume of solvent used, and greater yield of a recaptured species per size or number of process modules. Other advantages include, in some examples, increased rate and size of crystal growth as well as increased gas-to-liquid contact between untreated air and liquid solvent.

As used herein, a "target species" may refer to an airborne species present in an ambient environment at a low concentration. Examples of a target species may include carbon dioxide, carbon monoxide, hydrogen sulfide, nitrous oxides (e.g., NOx), and any combination thereof.

Figure 1:
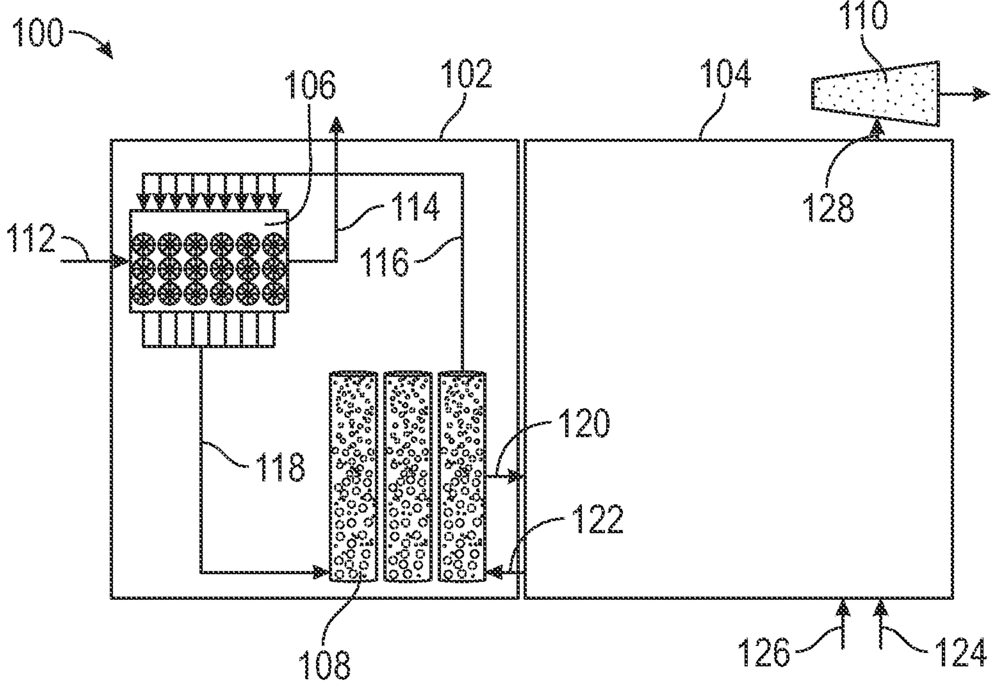
FIG. 1 illustrates a process flow diagram for direct air capture in accordance with some examples of the present disclosure.

FIG. 1 illustrates an example process 100 for performing direct air capture in accordance with examples of the present disclosure. As illustrated, process 100 may include first block 102 where the target species is removed from the incoming air and a second block 104 where the target species is concentrated and reagents are regenerated. Process 100 begins with introducing air stream 112 and treatment fluid 116 into gas-liquid contactor 106. Gas-liquid contactor 106 includes equipment which promotes the contact of the incoming air with the treatment fluid to facilitate mass transfer between the air and treatment fluid. In examples, gas-liquid contactor 106 may include, without limitation, a packed column, bubble column, spray tower, falling-film column, an agitated vessel, a trayed column, or a combination thereof. Gas-liquid contactor 106 may further include equipment to move volumes of air such as blowers, jet fans, air pumps, and the like, to force air into gas-liquid contactor 106. Gas-liquid contactor 106 may be configured to contact the incoming air and the treatment fluid by cross-flow, counter-current flow, co-currently flow, or any other suitable contact methods. Gas-liquid contactor 106 may maximize air-to-liquid contact, for example, by disrupting air flow with mechanical means (e.g., baffles), by counterflowing air stream 112 and treatment fluid 116, or by forming a highly turbulent fluid environment. For example, if gas-liquid contactor 106 comprises a static mixing, air stream 112, treatment fluid 116, or both may have a Reynold's number from about 1500 to about 5000, or any ranges therebetween at the time of contact. For example, about 3500 or greater, or about 4500 or greater. In other examples, a gas-liquid contactor 106 may comprise a packed bed, having structured packing material disposed therein. Where used, such structured packing may comprise one or more channels, the channels having channel sizes conductive for high volumetric flow rate of air or liquid. In some examples, these channels may comprise channel sizes of about 0.5 millimeters in diameter to about 10 centimeter in diameter. Alternatively, from about 0.5 millimeters to about 1 millimeter, about 1 millimeter to about 1 centimeter, about 1 centimeter to about 10 centimeters, or any ranges therebetween.

In general, the flux of the target species from the air to the treatment fluid may be primarily governed by the Henry's law constant for the solubility of the target species at the gas-liquid interface. To enhance the removal of the target species from the air, the components of the treatment fluid may be selected such that a reaction between the target species and a component of the treatment fluid forms a reaction product thus removing the target species from the incoming air. When reactive components are present in the treatment fluid, the flux of the target species into the treatment fluid may be further governed by the reaction kinetics of the target species with the treatment fluid.

As a result of contacting treatment fluid 116 and air stream 112 entering gas-liquid contactor 106, the treatment fluid may become rich in the target species and the air may become lean in the target species. Depending on various design factors including, for example, composition of treatment fluid 116, flow rate of air stream 112, turbulence, surface tension of treatment fluid 116, solubility of the target species in treatment fluid 116, among other design and operation factors, the target species may be removed from the incoming air to a target level. A target species may be present in treated air 114 in an amount from about 0.00001 vol. % to about 1 vol. %, or any ranges therebetween.

Alternatively, from about 0.00001 vol. % to about 0.0001 vol. %, about 0.0001 vol. % to about 0.001 vol. %, about 0.001 vol. % to about 0.01 vol. %, about 0.01 vol. % to about 0.1 vol. %, about 0.1 vol. % to about 1.0 vol. %, or any ranges therebetween A target species may be present in treated air 114 in an amount from about 0.00001 vol. % to about 1 vol. %, or any ranges therebetween. Alternatively, from about 0.00001 vol. % to about 0.0001 vol. %, about 0.0001 vol. % to about 0.001 vol. %, about 0.001 vol. % to about 0.01 vol. %, about 0.01 vol. % to about 0.1 vol. %, about 0.1 vol. % to about 1.0 vol. %, or any ranges therebetween.

Treatment fluid 116 may be conveyed to gas-liquid contactor 106 in any suitable fashion including via one or more fluid conduits, such as via a plurality of conduits as illustrated in FIG. 1. Following treatment of air stream 112, treated air 114 may exit out from gas-liquid contactor 106 and be introduced into one or more further gas-liquid contactors for further treatment, or may be discharged to battery limits, such as back into the ambient environment. After treatment fluid 116 is introduced into gas-liquid contactor 106 to contact air stream 112 and form treated air 114, the target species rich treatment fluid may exit gas-liquid contactor 106 as a contactor effluent 118. As mentioned previously, contactor effluent 118 may have an increased concentration and/or partial pressure of target species as compared to untreated air stream 112 when, for example, the target species is entrained, reacted with, or otherwise is present in treatment fluid 116. In one or more examples, partial pressure of the target species may not significantly increase if, for example, absorption is predominantly chemical absorption.

Treatment fluid 116 may include an aqueous base fluid, a component capable of reacting with the target species, and a surfactant. For example, treatment fluid 116 may include an aqueous base fluid and a basic component. Treatment fluid 116 may be basic, having a pH above 7, such as a pH in a range of about 7 to about 14, at standard temperature and pressure (273.15 K and 1 bar). Treatment fluid 116 may include a strong base, including, without limitation, Group (I) hydroxides. In particular, the base may include lithium hydroxide, sodium hydroxide, potassium hydroxide, and any combinations thereof. The base may be present in treatment fluid 116 in an amount from about 5% to about 40% by volume, for example. Alternatively, the base may be present in an amount to form a treatment fluid with a 0.5 M (molar) to 5M solution of the base. Alternatively, 0.5M to 1 M, 1 M to 2M, 2M to 3M, 3M to 4M, 4M to 5M, or any ranges therebetween. Treatment fluid 116 may also comprise solvent such as water or an organic solvent. Organic solvents may include, to use non-limiting examples, acetone, ethanol, methanol, toluene, xylene, ethyl acetate, methyl ethyl ketone, dichloromethane, N-hexane, isopropanol, or the like. A solvent may be present in an amount from about 60% by volume to about 95% by volume, for example. Treatment fluid 116 may also comprise one or more surfactants, to be discussed later in detail. Treatment fluid 116 may also comprise unspent or unreacted base, base from one or more make-up streams, as well as base regenerated by an ion exchange reaction, to be discussed later in detail.

Upon contacting air stream 112 with treatment fluid 116, the target species is exposed to treatment fluid 116 and a portion of the target species is absorbed into the treatment fluid whereby the target species and base present in the treatment fluid react to form a reaction product. This exposure results in formation of a reaction product as treatment fluid 116 is basic. Without being limited by theory, it is believed that reacting of air stream 112 and treatment fluid 116 begins at the time of initial contact and may continue for a time after as intermolecular collisions between any unreacted but physically absorbed or entrained species occur with reactive components of treatment fluid 116. Incorporation of one or more surfactants in treatment fluid 116, to be discussed later in detail, may lower an activation energy of physical and/or chemical absorption as well as, in some examples, the activation energy of reacting the absorbed target species and a reactive component (e.g., strong base) present in treatment fluid 116. In some examples, a surfactant may reduce intermolecular forces, such as hydrogen bonding, at an interface between the treatment fluid and air, thereby effectively increasing the number of available sites for absorption and thus the number of collisions between the target species and treatment fluid 116 for a given surface area. In some examples, a surfactant may possess both hydrophilic moieties and hydrophobic moieties, thereby allowing the surfactant to interact with polar and nonpolar substances and allowing the nonpolar substance to be dispersed or solubilized in a solvent. In examples where the target species is carbon dioxide, a reaction product formed by reacting air stream 112 with treatment fluid 116 may include a carbonate species corresponding to the base. For example, where a target species comprises carbon dioxide and where treatment fluid 116 comprises potassium hydroxide, a reaction product may comprise $K_2CO_3$. In another example, a reaction between carbon dioxide and NaOH may result in $Na_2CO_3$. In other examples, a caustic solution may comprise an amine, a Schiff base, a triazine, as well as a non-nitrogen or a non-triazine-based chemistry.

After exiting gas-liquid contactor 106, contactor effluent 118 comprising a reaction product of treatment fluid 116 and air stream 112 may be conveyed and introduced into reactor 108. Base stream 122 is introduced into reactor 108 and the components of contactor effluent 118 are contacted with a reacted with components of base stream 122. Specifically, a base from base stream 122 may react with a reaction product of contacting treatment fluid 116 with air stream 112. In one or more examples, interaction between base stream 122 and contactor effluent 118 may result in an ion exchange reaction product. Base stream 122 may include any suitable base which can form an ion exchange reaction product with the reaction product produced in gas-liquid contactor 106. For example, an ion exchange reaction between a previous reaction product (e.g., a carbonate) and a base from base stream 122 (e.g., $Ca(OH)_2$) may occur to form an ion exchange reaction product. The base in base stream 122 may include, without limitation, Group (II) hydroxides. As illustrated, base stream 122 may be an effluent of second block 102. In embodiments, the ion reaction product may be relatively less soluble in aqueous solution than the reaction product from the gas-liquid contactor. In one or more examples, an ion exchange reaction product may comprise a carbonate salt, such as calcium carbonate ($CaCO_3$). A double displacement reaction, or metathesis reaction, between a reaction product in contactor effluent 118 and a base stream 122 may occur and may conform to the following equation.

$$AB+CD\rightarrow AD+CB \quad \text{(eq. 1)}$$

where AB is a reaction product of contacting air stream 112 with treatment fluid 116 in gas-liquid contactor 106, CD is base from base stream 122, AD is a regenerated component of treatment fluid 116, and CB is an ion exchange reaction product. In some examples, AB may comprise a carbonate as previously discussed, and AD may comprise regenerated solvent (e.g., caustic), such as a regenerated KOH or regenerated NaOH. A solution comprising regenerated solvent AD may be reintroduced to treatment fluid 116 and/or into gas-liquid contactor 106. Make-up treatment fluid may also be added to treatment fluid 116 to account for any losses during treatment of air stream 112 in first block 102. In some examples, solvent may be regenerated in lime slaker 202 (e.g., referring to FIG. 2) in addition or alternative to reactor 108. In some examples, KOH and NaOH may both be present in treatment fluid 116.

Reactor 108 may include one or more fluidized bed reactors. Where reactor 108 comprises a plurality of reactors, the reactors may be configured in series or in parallel. A fluidized bed reactor may be configured to fluidize the reaction components to further promote high dispersion, and thus rate of crystal growth. For example, in some examples, fluid from contactor effluent 118 may be introduced (e.g., from below) into reactor 108 to fluidize one or more crystals disposed at a given time within reactor 108. Alternatively, a fluidizing gas (e.g., inert gas, air, or other fluidizing gas) may be introduced into reactor 108 during precipitation and formation of solids from contactor effluent 118. Contactor effluent 118 may be continuously, or batch fed to reactor 108. In one or more examples, contactor effluent 118 may be seeded by introducing one or more seed crystals for accelerating crystal growth. Seeding may occur within reactor 108 or may occur prior to introduction of contactor effluent 118 to reactor 108.

In addition to facilitating an ion exchange reaction between contactor effluent 118 and base stream 122, reactor 108 may be equipped to facilitate precipitation of the ion exchange reaction product. Particularly, precipitation of an ion exchange reaction product in reactor 108 may result in the forming of crystals, or crystals. Crystal growth of crystals in reactor 108 may be governed by a variety of factors including, for example, temperature, pH, agitation rate, presence or absence of impurities, mean residence time of solids in reactor 108, amount or concentration of seeding crystals such as feed rate of seeding crystals. Another factor affecting crystal growth rate as well as crystal size may include dispersancy, which may be a property affected by the identity and concentration of a surfactant present in contactor effluent 118 entering reactor 108.

As discussed above, a surfactant may be included in treatment fluid 116 which is carried over into contactor effluent 118. Alternatively, or in addition to surfactant included in treatment fluid 116, additional surfactant may be introduced into contactor effluent 118 prior to contactor effluent 118 being introduced into reactor 108. The surfactant in contactor effluent 118 may promote dispersion of crystals within reactor 108. Dispersion of solids within reactor 108 may promote crystal growth by increasing the effective surface area for crystal growth and thus the number of nucleation sites, thereby facilitating transport of a solute to a crystal's surface and increasing nucleation rate. In one or more examples, crystal growth of the ion exchange reaction product in reactor 108 may be assisted by sonication, for example, by sonifying reactor 108 with a high-frequency sound wave using a sonicator.

Depending on reactor conditions, crystalizing of a product of an ion exchange reaction may be thermodynamically favored and thus happen spontaneously in reactor 108. In other examples, reactor conditions of reactor 108 may require modification to ensure favorable thermodynamic conditions. As previously mentioned, incorporation of one or more surfactants, to be discussed later in greater detail, may enhance dispersion of solids within reactor 108 and otherwise promote agglomeration, thereby allowing crystal growth to occur both faster and to a greater extent. In some examples, modifying a thermodynamic condition may comprise cooling, such as by cooling one or more internal or external surfaces of reactor 108 or one or more inlet streams (e.g., contactor effluent 118 or base stream 122), and/or reactor 108 with one or more coolers and/or cooling streams to promote precipitation. In some examples, crystalizing of the ion exchange reaction product may result in crystals having a size in a range of about 0.01 mm to about 1 mm. Crystals produced by reactor 108 may have an average size of about 0.01 mm to about 0.1 mm, 0.1 mm to about 1 mm. Alternatively, from about 0.1 mm to about 0.3 mm, about 0.3 mm to about 0.7 mm, about 0.7 mm to about 1 mm, or any ranges therebetween. The ion exchange reaction product from reactor 108 may be separated from the bulk fluid present in reactor 108. For example, the ion exchange reaction product may be separated using, for example, filtration, centrifugation, decantation, sedimentation, flotation, or any other suitable methods.

From reactor 108, the ion exchange reaction product may then be separated and conveyed to second block 104 via stream 120. In second block 104, the ion exchange reaction product may be dried and heated to decompose the ion exchange reaction product to release the target species. Decomposition may comprise forming a corresponding oxide of the ion exchange reaction product, such as calcium oxide for $CaCO_3$ ion exchange reaction product, water, and a target species 128 such as concentrated carbon dioxide. Heating may be performed by, for example, combusting fuel 124 with air or oxygen 126. Fuel 124 may comprise any suitable combustible fuel including, without limitation, hydrogen, natural gas, coal, diesel, gasoline, jet fuel, JET-A, JP-8, kerosene, biofuel, syngas, biogas, ethanol, charcoal, lignite, petroleum coke, blast furnace gas, coke oven gas, methanol, nitromethane, green hydrogen, pink hydrogen, blue hydrogen, derivatives, combinations, or the like. Alternatively, heating may be performed by one or more electric heaters. Once formed, target species 128 released during decomposition may be removed and used or otherwise sequestered, such as at an underground storage site (e.g., carbon capture underground storage wells). Conveyance of a target species away from second block 104 may be preceded by compressing in one or more compressors 110 as illustrated. In addition, an ion exchange reaction with contactor effluent 118 may regenerate one or more components of treatment fluid 116 (e.g., NaOH, KOH, LiOH, etc.), which may then be reintroduced to gas-liquid contactor 106.

Regeneration of one or more components of treatment fluid 116 may be a natural result of performing an ion exchange reaction in reactor 108, as previously discussed. An effluent of reactor 108 may be recycled back to gas-liquid contactor 106 as treatment fluid 116 or may be combined with one or more make-up streams to form treatment fluid 116 prior to being reintroduced to gas-liquid contactor 106. As such, treatment fluid 116 reintroduced to gas-liquid contractor 106 may comprise regenerated base as well as one or more unspent components, such as any unreacted base, surfactants and/or other catalysts. Referring to equation 1, this regenerated component may refer to the "AD" product of an ion exchange reaction.

Figure 2:
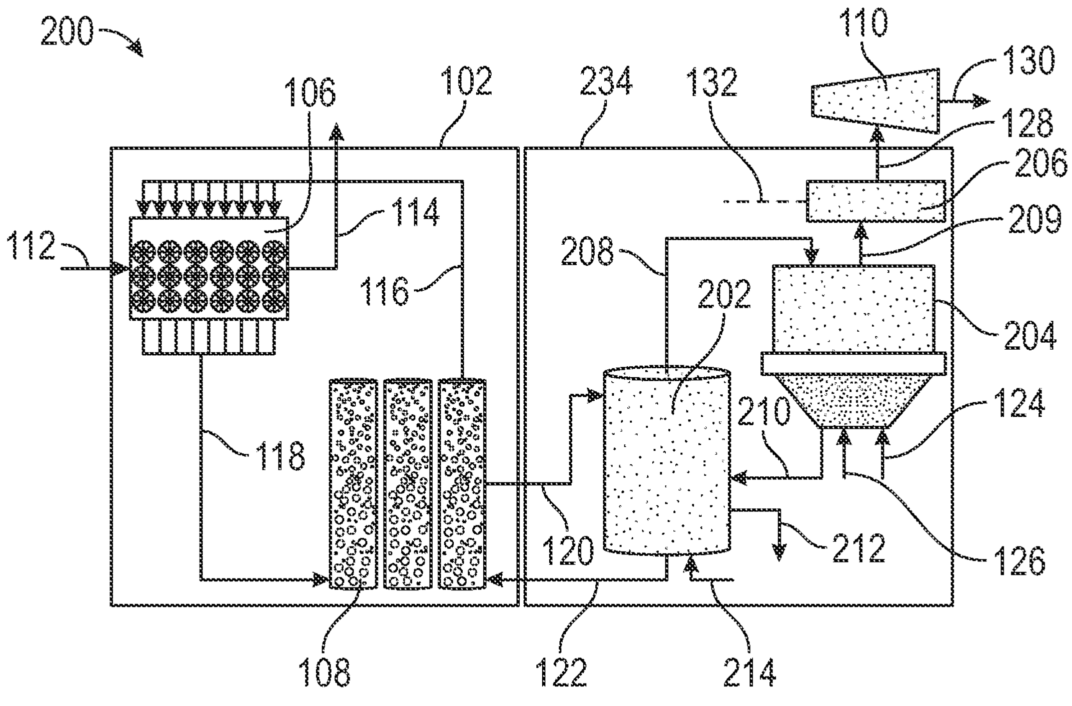
FIG. 2 illustrates another process flow diagram for direct air capture in accordance with some examples of the present disclosure.

FIG. 2 illustrates another process 200 for direct air capture in accordance with some examples of the present disclosure. As with process 100 in FIG. 1, process 200 may generally include a first block 102, identical to first block 102 in FIG. 1, and a second block 234. Second block 234 may be equipped for heating and decomposing precipitates formed in first block 102 into one or more decomposition products. As shown, second block 234 may include a lime slaker 202, a calciner 204, and a separator 206.

As illustrated in FIG. 2, ion exchange reaction products formed in reactor 108 may be conveyed to lime slaker 202 via stream 120. In lime slaker 202, ion exchange reaction products are heated, dried, and withdrawn as dried ion exchange reaction product 208 and introduced into calciner 204. Additionally, water stream 214 and calcination product stream 210 may be introduced into lime slaker 202, whereby a calcination product from calcination product stream 210 and water from water stream 214 are additionally contacted in lime slaker 202. In examples, a calcination product includes lime (CaO). The water is reacted with the calcination product to produce a corresponding hydroxide, such as a group I or a group II hydroxide, for example, calcium hydroxide ($Ca(OH)_2$) as well as evolving heat in the process. As illustrated in FIG. 2, base stream 122 may be an effluent of lime slaker 202 and may comprise, for example, a group I or a group II hydroxide. For example, hydroxide formed by reacting the calcination product in lime slaker 202 may be returned to reactor 108 as base stream 122. The heat required to drive the drying of the ion exchange reaction products may be partially provided by the reaction of the calcination product as well as from the calcination product itself coming from the relatively hotter calciner. Water may be withdrawn from lime slaker 202 as outlet water stream 212 which may be recycled back to lime slaker 202.

The steam lime slaker 202 may be operated at any suitable temperature and pressure such as in a range of from about 200° C. to about 500° C., for example. Alternatively, from about 200° C. to about 300° C., about 300° C. to about 400°, about 400° C. to about 500° C., or any ranges therebetween. Likewise, the steam lime slaker 202 may be operated in a pressure range of from about 1 bar to 15 bar. Alternatively, from about 1 bar to about 3 bar, about 3 bar to about 7 bar, about 7 bar to 10 bar, about 10 bar to about 12 bar, about 12 bar to about 15 bar, or any ranges therebetween.

Calciner 204 may include one or more calcination furnaces, which use combustible fuels (e.g., fuel 124 and oxygen 126) or electricity to heat the incoming dried ion exchange reaction products. Heat generated in calciner 204 may be directed to lime slaker 202 to assist with drying the ion exchange products. This heat may alternatively, or additionally, be transferred to water in water stream 214 via, for example, one or more heat exchangers. In some examples, a calcination product, such as lime (e.g., CaO) in calcination product stream 210 may be conveyed back to lime slaker 202 and being hydroscopic, may further assist with drying.

Once dried in lime slaker 202, the ion exchange reaction product may be conveyed to calciner 204 where high temperatures may drive a decomposition reaction to decompose ion exchange reaction products into one or more decomposition products. Conveyance of crystals may be performed continuously or batch-wise, such as via a pneumatic conveyance system or a conveyor belt. Decomposition products may comprise calcium oxide, water, and a target species such as carbon dioxide. A calcination temperature of calciner 204 may be from about 750° C. to about 1250° C. Alternatively, from about 750° C. to about 850° C., about 850° C. to about 950° C., about 950° C. to about 1,150° C., about 1,150° C. to about 1,250° C., or any ranges therebetween. Hot gas 209 exiting calciner 204 may be separated into target species 128 and removable portion 132 using separator 206. Separator 206 may include any suitable equipment for separating components of hot gas 209, including condensers, and other equipment suitable for separating water from the target species. Removable portion 132 containing water and other species which are not the target species may then be recycled in process 200, such as to lime slaker 202 via water stream 214. Target species 128 may then be compressed in compressor 110 to form recaptured target species 130.

Following calcination in calciner 204, target species 128 formed during calcination may be removed from second block 234 as target species 128 and separated. Separation in separator 206 may be achieved using, for example, condensation. For example, separator 206 may comprise one or more condensers. Cooling of target species 128 may bring a temperature of target species 128 to a suitable range for allowing a removable portion 132 (e.g., water) to condense into a liquid phase, and may be achieved using one or more coolers, for example. Separating of removable portion 132 from hot gas 209 may produce a recapturable and concentrated target species 128. Target species 128 may then be compressed to form a pressurized gas, and in some instances, a supercritical fluid. Compression may be achieved using, for example, one or more compressors 110. Recaptured target species 130 may comprise pipeline grade carbon dioxide. In some examples, recaptured target species 130 may comprise carbon dioxide in an amount greater than 95%, 98%, 99%, or 99.9% by volume. Once compressed, recaptured target species 130 may be stored and transported (e.g., via one or more vehicles or a pipeline) to a target location for future use and/or sequestration.

As previously mentioned, treatment fluid 116 may include a surfactant. Surfactants may enhance the gas-to-liquid contact between air stream 112 and treatment fluid 116, thereby allowing for greater gas partitioning of a target species from air stream 112 as well as allowing for more efficient chemical absorption of a target species into treatment fluid 116. Surfactants may also contribute to precipitation and crystallization of the reaction product in reactor 108. In some examples, one surfactant may be included in the treatment fluid 116 entering gas-liquid contactor 106

Examples of surfactants which may be used in may include, but are not limited to, alcohols, phosphonates, sulfonates, phosphate esters, sulfate esters, acrylates, functionalized acrylates, branched or linear acrylic polymers, oligomeric acrylic polymers, branched or linear phosphate esters, branched or linear sulfate esters, compounds with quaternary moieties, quaternary amines, acrylic polymers, esters of amines, esters of alcohols, glycols such as ethylene glycol, and combinations thereof. In one or more examples, a surfactant may include an anionic surfactant, a cationic surfactant, a non-ionic surfactant, a zwitterionic surfactant, derivatives thereof, or any combinations thereof.

Specific examples of anionic surfactants may include, for example, sulfates, sulfonates, phosphates, carboxylates, and their derivatives. For example, a surfactant may include an alkyl sulfate such as ammonium lauryl sulfate, sodium lauryl sulfate, sodium laureth sulfate, and related alkyl-ether sulfates such as sodium laureth sulfate and sodium myreth sulfate. Other anionic surfactants include docusate (dioctyl sodium sulfosuccinate), perfluorooctanesulfonate, perfluorobutanesulfonate, alkyl-aryl ether phosphates, and alkyl ether phosphates. Carboxylates may include sodium stearate, sodium lauroyl sarcosinate, and carboxylate-based fluorosurfactants such as perfluorononanoate and perfluorooctanoate. Other specific examples of anionic surfactants include, for example, sodium, potassium, and ammonium salts of long chain alkyl sulfonates and alkyl aryl sulfonates (e.g., sodium dodecylbenzene sulfonate), taurates, dialkyl sodium sulfosuccinates (e.g., sodium dodecylbenzene sulfonate, sodium bis-(2-ethylthioxyl)-sulfosuccinate), sodium decylsulfate, alkyl sulfates (e.g., sodium lauryl sulfate), alkyl sulfonates (e.g., methyl sulfonate, heptyl sulfonate, decylbenzene sulfonate, dodecylbenzene sulfonate), alkoxylated sulfates, alkoxylated fatty acids, dodecylbenzenesulfonic acid, sodium cocoyl isethionate, glycol monobutyl ether, alpha-olefin sulfonate, alkylether sulfates, alkyl phosphonates, alkane sulfonates, fatty acid salts, acrylsulfonic acid salts.

Specific examples of cationic surfactants may include, for example, octenidine dihydrochloride, cetyltrimethylammonium chloride, trimethyltallowammonium chloride, dimethyldicocoammonium chloride, bis(2-hydroxyethyl) tallow amine, bis(2-hydroxyethyl) erucylamine, bis(2-hydroxyethyl) coco-amine, benzalkonium chloride, cocamidopropyl betaine, lauryl dimethylamine oxide, dodecylpyridinium chloride, stearalkonium chloride, hexadecylpyridinium chloride, polyquaternium, behentrimonium chloride, and trimethylammonium bromide. Other examples of cationic surfactants include, for example, alkyl ammonium bromides.

Specific examples of non-ionic surfactants may include, for example, compounds containing hydrophilic groups containing oxygen, the hydrophilic groups bonded to hydrophobic moieties. For example, non-ionic surfactants may include ethoxylated sorbitan esters (polysorbates), such as polysorbate 80. Other non-ionic examples may include triton X-100, as well as ethoxylated alcohols. For example, ethoxylated alcohols may include alkylphenol ethoxylates, linear or branched alcohol ethoxylates, nonylphenol ethoxylates, octylphenol ethoxylates, stearyl alcohol ethoxylates, lauryl alcohol ethoxylates, cetyl alcohol ethoxylates, fatty alcohol ethoxylates, and the like. Other non-ionic surfactants may include alkoxylates of polymeric pheons, alkylphenols, bisphenols, sugars, amines, imines, imidazolines, as well as simple and complex esters or crosslinked versions of the same. Other non-ionic examples include sorbitan esters such as sorbitan monostearate, sorbitan tristearate, or sorbitan monolaurate. Other non-ionic surfactants may include, for example, polyglucosides, such as alkyl polyglucosides.

Other examples of surfactants may include zwitterionic surfactants. Some zwitterionic surfactants include amphoteric surfactants. Non-limiting examples of amphoteric surfactants may include, for example, betaines (e.g., lauryl betaine, oleamidopropyl betaine, cetyl betaine, cocamidopropyl betaine, etc.), amine oxides (e.g., cocamine oxide, laurylamine oxide, dodecylamine oxide, etc.), sultaines (e.g., cocamidopropyl hydroxysultaine, lauryl hydroxysultaine, etc.), amphoacetates (e.g., cocamphoacetate and disodium cocamphoacetate), alkylamphoacetates (e.g., disodium lauryl amphoacetate and disodium cocoamphodiacetate, etc.), and the like. Amphoteric surfactants may include a cationic moiety (e.g., secondary amine, tertiary amine, quaternary ammonium cation, etc.) as well as an anionic moiety (e.g., sulfonates, sultaine, etc.). Other examples include 3-[(3-cholamidopropyl)dimethylammonio]-1-propanesulfonate, phosphatidylserine, phosphatidylethanolamine, and phosphatidylcholine.

Some zwitterionic are nonamphoteric and do not undergo significant charge changes over a wide range of pH values. Non-limiting examples of nonamphoteric surfactants may include betaine esters (e.g., coco-betaine ester, lauryl-betaine ester, and oleoyl-betaine ester, etc.), phosphobetaines (e.g., phosphatidylcholine, sphingomyelin, etc.), and imadazolines (cocamidopropyl hydroxy sultaine, lauryl hydroxy sultaine, etc.).

A surfactant may, in some examples, include a secondary, tertiary, or quaternary ammonium cation. Specific examples of tertiary amines include, for example, tertiary amine oxides (e.g., lauryldimethylamine oxide, myristamine oxide, etc.). Specific examples of quaternary ammonium salts include, for example, choline hydroxide, cetrimonium bromide, cetylpyridinium chloride, benzalkonium chloride, benzetheonium chloride, dimethyldioctadecylammonium chloride, dioctadecyldimethylammonium bromide, and fatty amine ethoxylate quat surfactants.

In some examples, a surfactant may include primary, secondary, or tertiary amines. Specific examples may include, dimethyl cocoamine oxide, and lauryl dimethylamine oxide.

In one or more examples, a surfactant may include a synthetic surfactant. Specific examples of synthetic surfactants may include, for example, sulfosuccinates (e.g., dialkyl sodium sulfosuccinate).

Additional specific examples of surfactants to be used in accordance with the present disclosure include linear or branched alkylbenzene sulfonates, lignin sulfonates, siloxane surfactants (e.g., polydimethylsiloxane, silsesquioxane, siloxane-polyether copolymers, polyethyleneoxide modified siloxanes, fluorinated siloxane surfactants, etc.), tall-oil-derived surfactants (e.g., reaction product of tall oil fatty acids with diethylenetriamine, maleic anhydride, tetraethylenepentamine and triethylenetetramine), per- and polyfluoroalkyl substances, fluorinated surfactants (e.g., fluorinated polymer surfactants, cationic fluorosurfactants with cationic and anionic salt moieties, etc.), viscoelastic surfactants (e.g., methyl ester sulfonates, ethoxylated amines), polymeric alkoxylates of phenolic resins, bis-phenol polymers, esters and complex esters thereof, low molecular-weight aliphatic moieties, polar organic functional groups such as amidoamines, amines, amides, silicates, glycols, polyacrylamide, partially hydrolyzed polyacrylamide, polyvinylpyrrodolidone, quaternized alkyl oraryl molecules, conjugates or derivatized macromolecules, oxidizer or oxidizing agents, reducer or reducing agents, metal (oxy) anion salts where the metal is a multivalent (n) cation (n=+2, +3, +4, +5, +6, +7) and the anion is a halide, sulfur or selenium, nitrogen or phosphorous, and combinations thereof. In another example, a surfactant may comprise 1-Acrylamido-2-methylpropanesulfonic acid (AMPS) terpolymer. AMPS terpolymers may be formed from three monomers: AMPS, acrylic acid, and a third monomer, for example, acrylamide, ethylene glycol dimethacrylate, or N,N'-methylenebisacrylamide.

A surfactant may be present in treatment fluid 116 or contactor effluent 118 in any suitable amount including, for example, an amount from about 0.01 wt. % to about 35 wt. %. Alternatively, from about 0.01 wt. % to about 0.1 wt. %, about 0.1 wt. % to about 1 wt. %, about 1 wt. % to about 5 wt. %, about 5 wt. % to about 10 wt. %, about 10 wt. % to about 15 wt. %, about 15 wt. % to about 20 wt. %, about 20 wt. % to about 35 wt. %, and any ranges therebetween.

A surfactant may be included at various locations in process 100. For example, a surfactant may be added to treatment fluid 116 prior to contacting air stream 112 in gas-liquid contactor 106. Additionally, or alternatively, a surfactant may be combined with contactor effluent 118, such as prior to reactor 108. In one or more examples, a surfactant may be combined with contactor effluent 118 and/or treatment fluid 116 at a region within gas-liquid contactor 106 or reactor 108. A surfactant may be added to any of the processing units or streams identified by FIG. 1 or 2. A surfactant may be present as a liquid additive metered into a process stream or otherwise incorporated into a liquid additive and introduced into a process stream. Alternatively, a surfactant may be solid at time of introduction to a process unit or process stream. In one or more examples, multiple surfactants may be used at various stages of a process illustrated by process 100. For example, a first liquid additive stream conveying a first surfactant or first mixture of a combination of surfactants may be introduced to treatment fluid 116 to enhance gas-to-liquid contacting of a target species with treatment fluid 116, for example. A second liquid additive stream conveying the first or a second surfactant or second combination of surfactants may be introduced to contactor effluent 118 to modify a nucleation rate within reactor 108, for example. Where used, these various stages may comprise the same or differing surfactants or combinations of surfactants.

For example, nucleation rate within reactor 108 for forming crystals may be performed by selecting an appropriate surfactant. To use non-limiting examples, such a surfactant for modifying nucleation rate may comprise an acrylic polymer, an acrylate polymer, an AMPS terpolymer, a functionalized acrylate polymer, a phosphonate, sulfate esters, thiophosphonates, thiophosphate esters, perforins, phosphates, N-phosphonomethyl iminodiacetic acid and ligands thereof, nitrilotriacetic acid and analogues thereof, ethylene diamine tetra acetic acid and derivatives thereof, C1 to C26 carboxylic acids and the esters and alkoxylates thereof, and any combinations thereof.

Accordingly, the present disclosure may provide methods and systems for efficient direct air capture of a target species. Specifically, methods and systems are disclosed for incorporating one or more surfactants into processes for recapturing carbon dioxide from ambient air. Use of these surfactants may result in improved gas-to-liquid contact between the ambient air and a treatment fluid and thus improve solubility of carbon dioxide in the treatment fluid. In addition, these surfactants may be used to promote crystal growth during precipitation of an ion-exchange product, thereby allowing for faster crystal growth.

The methods and systems may include any of the various features disclosed herein, including one or more of the following statements.

Statement 1: A method of direct air capture comprising: introducing an air stream comprising carbon dioxide into a gas-liquid contactor; contacting the air stream with a treatment fluid comprising a surfactant, wherein the carbon dioxide is at least partially soluble in the treatment fluid, and wherein the carbon dioxide reacts with the treatment fluid to form a reaction product; performing an ion exchange reaction between the reaction product and a base in the presence of the surfactant to form an ion exchange product; and precipitating the ion exchange product to form a precipitate.

Statement 2: The method of statement 1, wherein the treatment fluid comprises a group I or a group II hydroxide, wherein the reaction product comprises a carbonate, wherein the base comprises calcium hydroxide, and wherein the ion exchange product comprises calcium carbonate.

Statement 3: The method of any of the preceding statements, wherein the surfactant comprises at least one compound selected from the group consisting of an anionic surfactant, a cation surfactant, a non-ionic surfactant, a zwitterionic surfactant, and any combinations thereof.

Statement 4: The method of any of the preceding statements, wherein the surfactant comprises at least one compound selected from the group consisting of an acrylic polymer, an acrylate polymer, a linear or branched acrylic polymer, an AMPS terpolymer, or any combination thereof.

Statement 5: The method of any of the preceding statements, wherein the surfactant comprises a quaternary amine.

Statement 6: The method of any of the preceding statements, wherein the surfactant comprises choline hydroxide.

Statement 7: The method of any of the preceding statements, further comprising fluidizing the precipitate during the step of precipitating.

Statement 8: The method of any of the preceding statements, wherein the surfactant comprises at least one compound selected from the group consisting of a phosphate, a sulfate, a sulfate ester, a phosphate ester, a sulfonate, a phosphonate, a glycol, an alcohol, an alcohol alkoxylate, or any combination thereof.

Statement 9: The method of any of the preceding statements, wherein the surfactant is added to the treatment fluid as a liquid or a solid additive before contacting the air stream.

Statement 10: The method of any of the preceding statements 1, further comprising withdrawing an effluent stream from the gas-liquid contactor and adding the surfactant to the effluent stream.

Statement 11: The method of any of the preceding statements, further comprising: drying the precipitate in a lime slaker; and calcining the precipitate in a calciner to decompose the precipitate into a decomposition product, wherein the decomposition product comprises carbon dioxide, calcium oxide, and water.

Statement 12: The method of any of the preceding statements, wherein the method further comprises feeding at least a portion of the calcium oxide back to the lime slaker to dry the precipitate.

Statement 13: The method of any of the preceding statements, wherein the surfactant comprises at least one compound selected from the group consisting of a thiophosphonate, a thiophosphate ester, a perforin, a phosphate, N-phosphonomethyl iminodiacetic acid and any ligands thereof, nitrilotriacetic acid, ethylene diamine tetra acetic acid and any derivative thereof, a C1 to C26 carboxylic acid and any ester or alkoxylate thereof, and any combinations thereof.

Statement 14: The method of any of the preceding statements, wherein the surfactant comprises at least one compound selected from the group consisting of a polymeric pheon, an alkylphenol, a bisphenol, a sugar, an imine, an imidazoline, an ester, and any combination thereof.

Statement 15: A system comprising: a gas-liquid contactor for contacting air with a treatment fluid; a reactor in fluid communication with the atmospheric contactor for forming crystals; a calciner for heating the crystals in communication with the reactor; and a source of the treatment fluid in fluid communication with the atmospheric contactor, the treatment fluid comprising a liquid solvent and a surfactant.

Statement 16: The system of statement 15, wherein the liquid solvent comprises a group I or a group II hydroxide, and wherein the crystals comprise calcium carbonate.

Statement 17: The system of statements 15 or 16, wherein the surfactant comprises ethylene glycol or a branched alcohol alkoxylate.

Statement 18: The system of statements 15, 16, or 17, wherein the surfactant comprises at least one compound selected from the group consisting of an acrylic polymer, an acrylate polymer, a linear or branched acrylic polymer, an AMPS terpolymer, choline hydroxide, a quaternary amine, and any combinations thereof.

Statement 19: The system of statements 15, 16, 17, or 18, wherein the surfactant comprises at least one compound selected from the group consisting of a phosphate, a sulfate, a sulfate ester, a phosphate ester, a sulfonate, a phosphonate, a glycol, an alcohol, a polymeric pheon, an alkylphenol, a bisphenol, a sugar, an imine, an imidazoline, an ester, a thiophosphonate, a thiophosphate ester, a perforin, a N-phosphonomethyl iminodiacetic acid and any ligands thereof, nitrilotriacetic acid, ethylene diamine tetra acetic acid and any derivative thereof, a C1 to C26 carboxylic acid and any ester or alkoxylate thereof, and any combinations thereof.

Statement 20: The system of statements 15, 16, 17, 18, or 19, wherein the reactor comprises a fluidized bed reactor.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, as the present examples may be modified and practiced in different but equivalent manners apparent to those skilled in the art having the benefit of the teachings herein. Although individual examples are discussed, all combinations of each example are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of the present disclosure.

What is claimed is:

1. A method of direct air capture comprising:

introducing an air stream comprising carbon dioxide into a gas-liquid contactor;

contacting the air stream with a treatment fluid comprising a surfactant wherein the surfactant comprises choline hydroxide, wherein the carbon dioxide is at least partially soluble in the treatment fluid, and wherein the carbon dioxide reacts with the treatment fluid to form a reaction product;

performing an ion exchange reaction between the reaction product and a base in the presence of the surfactant to form an ion exchange product; and precipitating the ion exchange product to form a precipitate.

2. The method of claim 1, wherein the treatment fluid comprises a group I or a group II hydroxide, wherein the reaction product comprises a carbonate, wherein the base comprises calcium hydroxide, and wherein the ion exchange product comprises calcium carbonate.

3. The method of claim 1, wherein the surfactant comprises at least one compound selected from the group consisting of an anionic surfactant, a cationic surfactant, a non-ionic surfactant, a zwitterionic surfactant, and any combinations thereof.

4. The method of claim 1, further comprising fluidizing the precipitate during the step of precipitating.

5. The method of claim 1, wherein the surfactant is added to the treatment fluid as a liquid or a solid additive before contacting the air stream.

6. The method of claim 1, further comprising withdrawing an effluent stream from the gas-liquid contactor and adding the surfactant to the effluent stream.

7. The method of claim 1, further comprising: drying the precipitate in a lime slaker; and calcining the precipitate in a calciner to decompose the precipitate into a decomposition product, wherein the decomposition product comprises carbon dioxide, calcium oxide, and water.

8. The method of claim 7, wherein the method further comprises feeding at least a portion of the calcium oxide back to the lime slaker to dry the precipitate.

* * * * *